P. E. Garrin,

Steam-Boiler Cleaner.

No. 2,080. Reissued Oct. 3, 1865.

Witnesses:
Francis D. Pastorius
John Anderson

Inventor.
P. Eldredge Garrin

N. PETERS, PHOTO-LITHOGRAPHER, WASHINGTON, D. C.

UNITED STATES PATENT OFFICE.

P. ELDREDGE GARVIN, OF PHILADELPHIA, PENNSYLVANIA.

IMPROVEMENT IN MECHANISM FOR SCALING BOILER-TUBES.

Specification forming part of Letters Patent No. 49,255, dated August 8, 1865; antedated March 22, 1865; Reissue No. 2,080, dated October 3, 1865.

*To all whom it may concern:*

Be it known that I, P. ELDREDGE GARVIN, of Philadelphia, in the county of Philadelphia and State of Pennsylvania, have invented an Improved Machine for Scaling the Tubes of Steam-Boilers; and I do hereby declare that the following is a full, clear, and exact description thereof, reference beinghad to the accompanying drawings, and to the letters of reference marked thereon.

My invention relates to removing the scale deposited on the inside of the tubes of steam-boilers by means of a revolving cutter.

In order to enable skilled mechanics to make and use my invention, I will proceed to describe its construction and operation.

Figure 1:
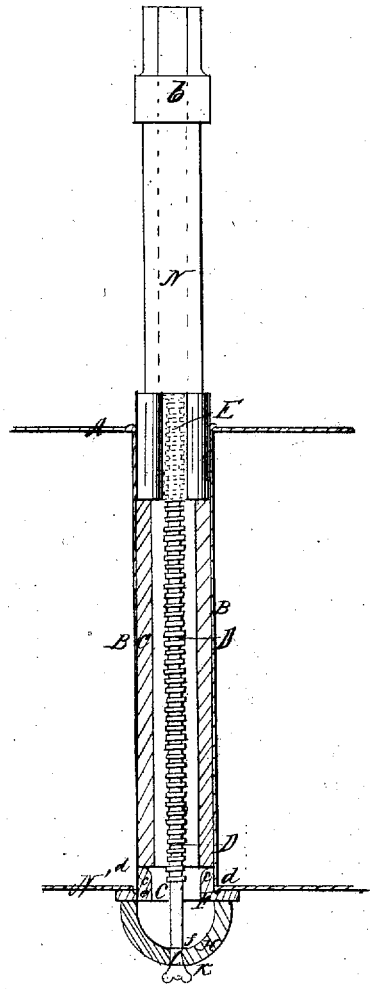
Figure 2:
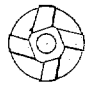
Figure 4:
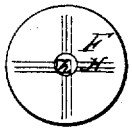
Figure 3:
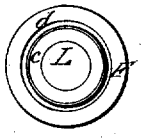

On reference to the accompanying drawings, which form a part of this specification, Figure 1 is a sectional view. Fig. 2 is a bottom view of the cutter. Fig. 3 is a view of the base-plate, showing the groove and conical projection; and Fig. 4 is a view of the base-plate and dog.

Similar letters refer to similar parts in the several views.

A and A′ represent the top and bottom tube-sheets of a steam-boiler.

B is a tube with an inside coating of scale, C.

D is a stationary feed-screw which passes the whole length of the tube and is centered at one end by the dog H and at the other by the cutter E, which is tapped to correspond with the screw and revolve on it. The base-plate F has its wedge-shaped gland *e* projecting into the tube, (the scale at that end being first removed to receive it,) and expands it and keeps it tight and free from leakage. The dog H rests upon the base-plate and has the opening *h* in its boss *g* made square to correspond with the square end of the screw-shank, so that when the shoulder *f* of the screw-shank is firmly held in place against the inner side of the boss by the thumb-screw K the screw D is prevented from lifting and turning. The groove *d* is cut in the under face of the base-plate for receiving the lap *e* of the tube. The opening L in the base-plate and gland is made of sufficient diameter to allow the scale-cuttings to drop out between its circumference and the screw-shank. I do not confine myself to the use of the base-plate F in connection with the dog H, but propose to use the dog without the base-plate by having a lug on the bottom of each leg of the dog, the lug to extend into the tube and the leg to bear against the end of it. The cutter E is screwed on or otherwise attached to the shank N, which has the socket *b* connected to it, so that if the shank should not be of sufficient length to work the cutter to the bottom of the tube the socket can be detached and an additional shank and socket attached. There is a continuous opening through the cutter, shank, and socket for receiving the screw as the cutter works down. In this case I have used a wing-cutter; but I wish it distinctly understood that I do not confine myself to a cutter of any particular kind.

In proceeding to scale a tube I first screw cutter on the screw, which is passed into the tube, its lower end or shank projecting beyond the tube-sheet, the face of the cutter resting on the scale. The base-plate and dog, or the dog alone and the thumb-screw, are then attached, as shown in Fig. 1. The cutter is worked by a ratchet-wrench, or any suitable tool for giving the cutter a rotary motion, while the screw imparts the necessary feed by keeping the cutter screwed down or fed into the scale.

What I claim as my invention, and desire to secure by Letters Patent, is—

The combination of the revolving cutter E, the stationary guide and feeding screw-rod D, and the centering draft-dog H, as and for the purpose as herein specified and described.

In witness whereof I have signed my name to this specification in presence of two subscribing witnesses.

P. ELDREDGE GARVIN.

Witnesses at signing:

FRANCIS D. PASTORIUS,

JOHN ANDERSON.